US012112683B2

(12) United States Patent
Chan et al.

(10) Patent No.: US 12,112,683 B2
(45) Date of Patent: Oct. 8, 2024

(54) DISPLAY APPARATUS AND CONTROL METHOD FOR DISPLAY APPARATUS

(71) Applicant: Innolux Corporation, Miaoli County (TW)

(72) Inventors: Chien-Hung Chan, Miaoli County (TW); Chan-Feng Chiu, Miaoli County (TW); Pei-Syun Lian, Miaoli County (TW); Wei-Chen Lu, Miaoli County (TW); Jen-Jen Hu, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/331,159

(22) Filed: Jun. 7, 2023

(65) Prior Publication Data

US 2024/0021136 A1 Jan. 18, 2024

Related U.S. Application Data

(60) Provisional application No. 63/388,646, filed on Jul. 13, 2022.

(30) Foreign Application Priority Data

Mar. 22, 2023 (CN) ........................ 202310285191.X

(51) Int. Cl.

| | |
|---|---|
| ***G09G 3/20*** | (2006.01) |
| ***G09G 3/32*** | (2016.01) |
| ***G09G 3/3208*** | (2016.01) |
| ***G09G 3/36*** | (2006.01) |
| ***H04N 7/01*** | (2006.01) |

(52) U.S. Cl.

CPC ... *G09G 3/2092* (2013.01); *G09G 2310/0254* (2013.01); *G09G 2310/0275* (2013.01); *G09G 2320/0209* (2013.01)

(58) Field of Classification Search

USPC ............................................................ 345/55

See application file for complete search history.

(56) References Cited

U.S. PATENT DOCUMENTS

2008/0001889 A1* 1/2008 Chun .................. G09G 3/3614 345/96
2009/0231363 A1* 9/2009 Liu ...................... G09G 3/3688 345/690
2014/0184580 A1* 7/2014 Cho ..................... G09G 3/3696 345/212

(Continued)

FOREIGN PATENT DOCUMENTS

CN 106531043 7/2019

*Primary Examiner* — Chineyere D Wills-Burns
(74) *Attorney, Agent, or Firm* — JCIPRNET

(57) ABSTRACT

A display apparatus for adjusting image data and a control method for the display apparatus are provided. The display apparatus includes a data line, a first pixel electrode, a second pixel electrode, and a processing circuit. The processing circuit generates first original image data and second original image data according to an original image, and generates display data according to a difference between the second original image data and the first original image data and a relationship between first polarity data and second polarity data. The processing circuit provides the display data to the second pixel electrode through the data line.

20 Claims, 8 Drawing Sheets

(56) References Cited

U.S. PATENT DOCUMENTS

| | | | | |
|---|---|---|---|---|
| 2016/0111052 | A1* | 4/2016 | Jeong | G09G 3/3614 345/96 |
| 2017/0004787 | A1* | 1/2017 | Han | G09G 3/3611 |
| 2017/0069278 | A1* | 3/2017 | Kim | G09G 3/3614 |
| 2017/0076652 | A1* | 3/2017 | Wang | G09G 3/20 |
| 2017/0103695 | A1* | 4/2017 | Nishimura | G09G 3/2018 |
| 2021/0225248 | A1* | 7/2021 | Cheng | G09G 3/20 |
| 2023/0031946 | A1* | 2/2023 | Kang | G09G 3/3614 |
| 2023/0326390 | A1* | 10/2023 | Hsieh | G09G 3/3614 345/55 |
| 2024/0038109 | A1* | 2/2024 | Chen | G09G 3/3677 |

* cited by examiner

DISPLAY APPARATUS AND CONTROL METHOD FOR DISPLAY APPARATUS

CROSS-REFERENCE TO RELATED APPLICATION

This application claims the priority benefits of U.S. provisional application Ser. No. 63/388,646, filed on Jul. 13, 2022, and China application serial no. 202310285191.X, filed on Mar. 22, 2023. The entirety of each of the above-mentioned patent applications is hereby incorporated by reference herein and made a part of this specification.

BACKGROUND

Technical Field

The disclosure relates to a display apparatus and a control method for the display apparatus, and in particular to a display apparatus for adjusting image data and a control method for the display apparatus.

Description of Related Art

The current display apparatus can improve the issue of display cross-talk through performing polarity reversal on image data of some pixels. However, when the display apparatus has, for example, a dual-gate line driving structure, the charging time of a data line becomes shorter. Within the same frame, the display apparatus may perform polarity switching (also referred to as polarity reversal) on at least one image data corresponding to the same data line and stop performing polarity switching on at least one other image data. Therefore, under, for example, the dual-gate line driving structure, when polarity switching is performed on the image data, the visual effect presented by the pixels based on the image data may be distorted. Therefore, how to provide an image data adjustment mechanism applicable to the two situations of performing polarity switching on the image data and stop performing polarity switching on the image data is one of the research focuses of persons skilled in the art.

SUMMARY

The disclosure provides a display apparatus for adjusting image data and a control method for the display apparatus.

According to an embodiment of the disclosure, a display apparatus includes a data line, a first pixel electrode, a second pixel electrode, and a processing circuit. The first pixel electrode is coupled to the data line. The second pixel electrode is coupled to the data line. The processing circuit generates first polarity data and second polarity data, and generates first original image data corresponding to the first polarity data and second original image data corresponding to the second polarity data according to an original image, and generates display data according to a difference between the second original image data and the first original image data and a relationship between the second polarity data and the first polarity data. The processing circuit provides the display data to the second pixel electrode through the data line.

According to an embodiment of the disclosure, a control method is applicable to a display apparatus. The display apparatus includes a data line, a first pixel electrode, and a second pixel electrode. The first pixel electrode and the second pixel electrode are coupled to the data line. The control method includes the following steps. First original image data and second original image data are generated according to an original image. The first original image data corresponds to first polarity data, and the second original image data corresponds to second polarity data. Display data is generated according to a difference between the second original image data and the first original image data and a relationship between the second polarity data and the first polarity data. The display data is provided to the second pixel electrode through the data line.

Based on the above, the processing circuit generates the display data according to the relationship between the first polarity data and the second polarity data and the relationship between the first original image data and the second original image data. In this way, regardless of whether polarity switching is performed on the second original image data, the risk of distortion of the visual effect presented by the display apparatus based on the display data can be reduced.

DETAILED DESCRIPTION OF DISCLOSED EMBODIMENTS

Figure 1:
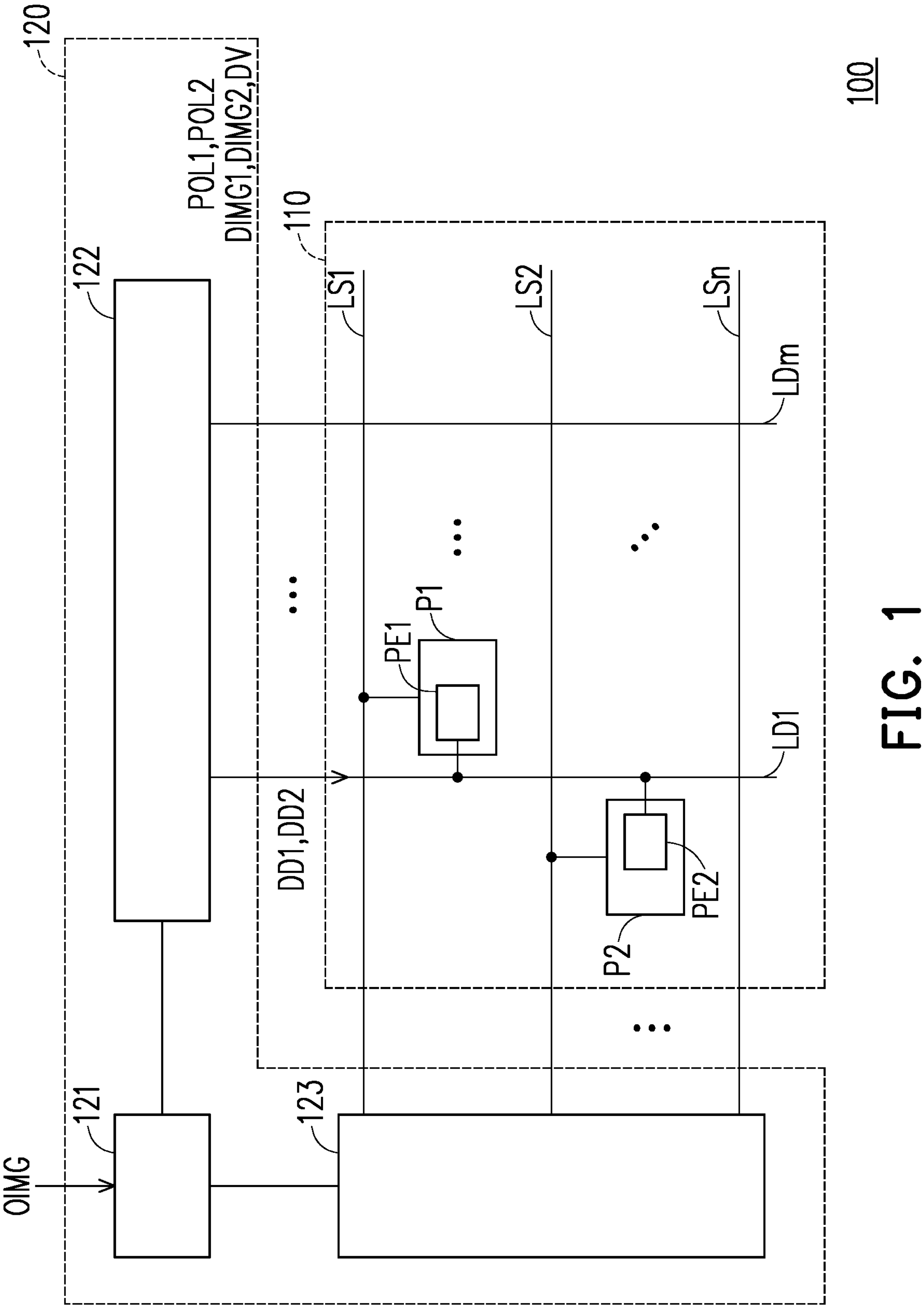
FIG. 1 is a schematic diagram of a display apparatus according to an embodiment of the disclosure.

The disclosure may be understood with reference to the following detailed description taken in conjunction with the drawings as described below. It should be noted that for the purpose of clarity and ease of understanding by the reader, various drawings of the disclosure depict a part of an electronic device, and certain components in the various drawings may not be drawn to scale. Furthermore, the number and the size of each device shown in the drawings are illustrative only and are not intended to limit the scope of the disclosure.

Certain terms are used throughout the description and the following claims to refer to specific components. As understood by persons skilled in the art, electronic apparatus manufacturers may refer to the components by different names. The disclosure does not intend to distinguish between the components that differ by name but not function. In the following description and in the claims, the terms "comprising", "including", and "having" are used in an open-ended manner and should therefore be interpreted to mean "comprising but not limited to . . . ". Therefore, when the terms "comprising", "including", and/or "having" are used in the description of the disclosure, the same indicates the presence of a corresponding feature, region, step, operation, and/or component, but is not limited to the presence of one or more corresponding features, regions, steps, operations, and/or components.

It should be understood that when a component is referred to as being "coupled to", "connected to", or "conducted to" another component, the component may be directly connected to the other component and may directly establish electrical connection or there may be an intermediate component between the components for relaying electrical connection (indirect electrical connection). In contrast, when a component is referred to as being "directly coupled to", "directly conducted to", or "directly connected to" another component, there is no intermediate component present.

Although terms such as first, second, and third may be used to describe different constituent components, such constituent components are not limited by the terms. The terms are only used to distinguish a constituent component from other constituent components in the specification. The claims may not use the same terms, but may use the terms first, second, third, etc. with respect to the required order of the components. Therefore, in the following description, a first constituent component may be a second constituent component in the claims.

An electronic device of the disclosure may include a display apparatus, an antenna device, a sensing device, a light emitting device, a touch display device, a curved display device, or a free shape electronic device, but not limited thereto. The electronic device may include a bendable or flexible electronic device. The electronic device may include, for example, liquid crystal, a light emitting diode, quantum dot (QD), fluorescence, phosphor, other suitable display media, or a combination of the above materials, but not limited thereto. The light emitting diode may include, for example, an organic light emitting diode (OLED) or an inorganic light emitting diode. The inorganic light emitting diode may be a chip or a die and may include, for example, a mini LED, a micro LED, a quantum dot LED (QLED or QDLED), other suitable materials, or a combination of the above, but not limited thereto. The display apparatus may include, for example, a splicing display apparatus, but not limited to. The antenna device may be, for example, a liquid crystal antenna, but not limited thereto. The antenna device may include, for example, an antenna splicing device, but not limited to. It should be noted that the electronic device may be any arrangement combination of the above, but not limited thereto. In addition, the appearance of the electronic device may be rectangular, circular, polygonal, a shape having curved edges, or other suitable shapes. The electronic device may have a peripheral system such as a driving system, a control system, and a light source system to support the display apparatus, the antenna device, or the splicing device, but the disclosure is not limited thereto. The sensing device may include a camera, an infrared sensor, a fingerprint sensor, etc., and the disclosure is not limited thereto. In some embodiments, the sensing device may also include a flash light, an infrared (IR) light source, other sensors, an electronic component, or a combination of the above, but not limited thereto. The following will take the electronic device including the display apparatus as an example to describe the content of the disclosure, but the disclosure is not limited thereto.

In the disclosure, embodiments use a "pixel" or "pixel unit" to describe a unit including a specific region of at least one functional circuit for at least one specific function. The region of the "pixel" depends on the unit for providing the specific function, and adjacent pixels may share the same component or wire, but may also include their own specific parts. For example, the adjacent pixels may share the same scan line or the same data line, but the pixels may also have their own transistors or capacitors.

It should be noted that technical features in different embodiments described below may be replaced, recombined, or mixed with each other to constitute another embodiment without departing from the spirit of the disclosure.

Figure 2:
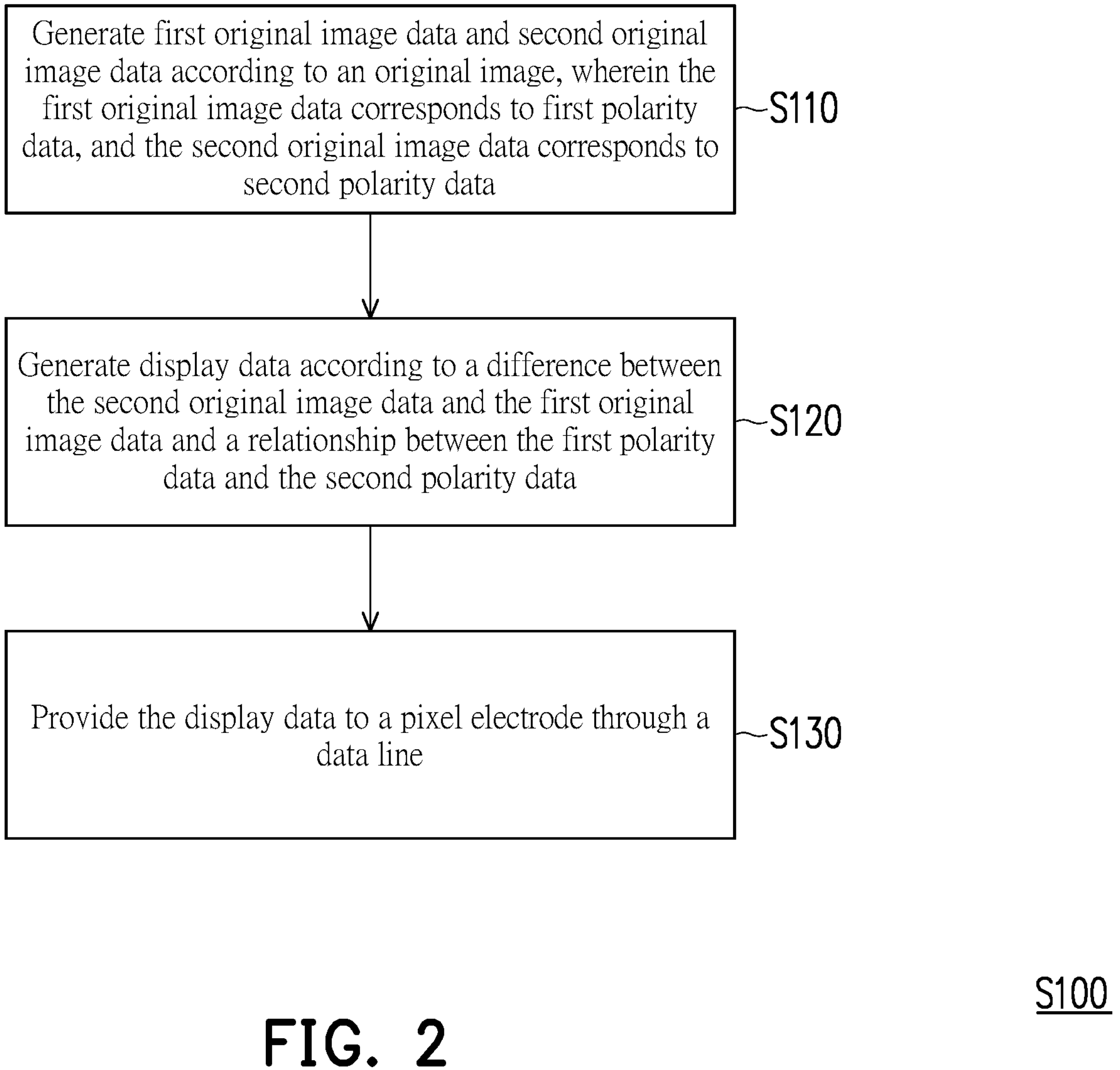
FIG. 2 is a flowchart of a control method according to an embodiment of the disclosure.

Please refer to FIG. 1 and FIG. 2 at the same time. FIG. 1 is a schematic diagram of a display apparatus according to an embodiment of the disclosure. FIG. 2 is a flowchart of a control method according to an embodiment of the disclosure. In the embodiment, a display apparatus 100 includes data lines LD1 to LDm, a pixel array 110, and a processing circuit 120. The pixel array 110 includes multiple pixel units. Each of the pixel units includes a pixel electrode. The pixel electrode is an electrode for receiving image data or display data. In the embodiment, in order to clearly describe the technical concept of the disclosure, the embodiment shows a pixel unit P1 and a pixel unit P2. The pixel unit P1 includes a first pixel electrode PE1. The pixel unit P2 includes a second pixel electrode PE2. The first pixel electrode PE1 is coupled to the data line LD1. The second pixel electrode PE2 is also coupled to the data line LD1. The processing circuit 120 is coupled to the data lines LD1 to LDm.

A control method S100 is applicable to the display apparatus 100. In Step S110, the processing circuit 120 generates first polarity data POL1 and second polarity data POL2, and generates first original image data DIMG1 and second original image data DIMG2 according to an original image OIMG. The first original image data DIMG1 corresponds to the first polarity data POLL The second original image data DIMG2 corresponds to the second polarity data POL2. In the embodiment, the processing circuit 120 receives the original image OIMG, converts information corresponding to the first pixel electrode PE1 in the original image OIMG into the first original image data DIMG1, and converts information corresponding to the second pixel electrode PE2 in the original image OIMG into the second original image data DIMG2.

In Step S120, the processing circuit 120 generates display data DD2 according to a difference DV (also referred to as data difference) between the second original image data DIMG2 and the first original image data DIMG1 and a relationship between the first polarity data POL1 and the second polarity data POL2. In detail, the processing circuit 120 subtracts the first original image data DIMG1 from the second original image data DIMG2 to obtain the difference DV. The processing circuit 120 obtains the relationships among the first polarity data POL1, the second polarity data POL2, the first original image data DIMG1, and the second original image data DIMG2. The processing circuit 120 generates the display data DD2 corresponding to the second original image data DIMG2 according to the difference DV and the relationship.

In Step S130, the processing circuit 120 provides the display data DD2 to the second pixel electrode PE2 through the data line LD1.

For example, during a first period, the processing circuit 120 provides display data DD1 corresponding to the first original image data DIMG1 to the data line LD1. During a second period following the first period, the processing circuit 120 provides the display data DD2 corresponding to the second original image data DIMG2 to the data line LD1. The first original image data DIMG1 and the second original image data DIMG2 may be, for example, grayscale values, but the disclosure is not limited thereto. In an embodiment, the first polarity data POL1 and the second polarity data POL2 may both be, for example, 0 or 1, which means that the second original image data DIMG2 and the first original image data DIMG1 have the same polarity and are not performed with polarity switching. The first polarity data POL1 being 0 may represent negative polarity and being 1 may represent positive polarity, but the disclosure is not limited thereto. Therefore, the processing circuit 120 performs a first adjustment on the second original image data DIMG2 according to the difference DV, thereby generating the display data DD2.

In addition, in another embodiment, when the first polarity data POL1 and the second polarity data POL2 have different values (for example, the first polarity data POL1 is 0 and the second polarity data POL2 is 1 or the first polarity data POL1 is 1 and the second polarity data POL2 is 0), it means that the second original image data DIMG2 is performed with polarity switching compared with the first original image data DIMG1. Therefore, the processing circuit 120 performs a second adjustment on the second original image data DIMG2 according to the difference DV, thereby generating the display data DD2. The second adjustment is different from the first adjustment. Compared with the first adjustment, the second adjustment may, for example, additionally add an over drive (OD) compensation.

It is worth mentioning here that the processing circuit 120 generates the display data DD2 according to the difference DV, the relationship between the first polarity data POL1 and the second polarity data POL2, and the relationship between the first original image data DIMG1 and the second original image data DIMG2. The processing circuit 120 provides the display data DD2 to the second pixel electrode PE2 through the data line LD1. Therefore, the processing circuit 120 adjusts or compensates the second original image data DIMG2 through judging whether the polarity of the second original image data DIMG2 is switched compared with the polarity of the first original image data DIMG1 and the difference DV, thereby generating the display data DD2. The embodiment provides different image data adjustment or compensation mechanisms applicable to the two situations of performing polarity switching on the second original image data DIMG2 and not performing polarity switching on the second original image data DIMG2. In this way, regardless of whether polarity switching is performed on the second original image data DIMG2, the risk of distortion of the visual effect presented by the pixel unit P2 based on the display data DD2 can be reduced.

In the embodiment, the processing circuit 120 includes a timing controller 121, a source driver 122, and a gate driver 123, but the disclosure is not limited thereto. In an embodiment, the processing circuit 120 may include the timing controller 121, but the disclosure is not limited thereto. The timing controller 121 generates the first polarity data POL1 and the second polarity data POL2, and generates the first original image data DIMG1 and the second original image data DIMG2 according to the original image OIMG. The timing controller 121 subtracts the first original image data DIMG1 from the second original image data DIMG2 to obtain the difference DV. The processing circuit 120 generates the display data DD2 according to the relationship between the first polarity data POL1 and the second polarity data POL2 and the relationship between the first original image data DIMG1 and the second original image data DIMG2. The source driver 122 generates voltage values corresponding to the display data DD1 and the display data DD2 according to the display data DD1 and the display data DD2, and provides the voltage value corresponding to the display data DD1 to the first pixel electrode PE1 through the data line LD1 and provides the voltage value corresponding to the display data DD2 to the second pixel electrode PE2 through the data line LD1.

In an embodiment, the processing circuit 120 may be implemented by a single circuit component. The disclosure is not limited to the implementation of the processing circuit 120 shown in FIG. 1.

The gate driver 123 is coupled to the pixel array 110 through scan lines LS1 to LSn. During the first period, the gate driver 123 scans the pixel unit P1 through the scan line LS1. Therefore, the first pixel electrode PE1 receives the voltage value corresponding to the display data DD1 during the first period. During the second period, the gate driver 123 scans the pixel unit P2 through the scan line LS2. Therefore, the second pixel electrode PE2 may receive the voltage value corresponding to the display data DD2 during the second period.

Figure 3A:
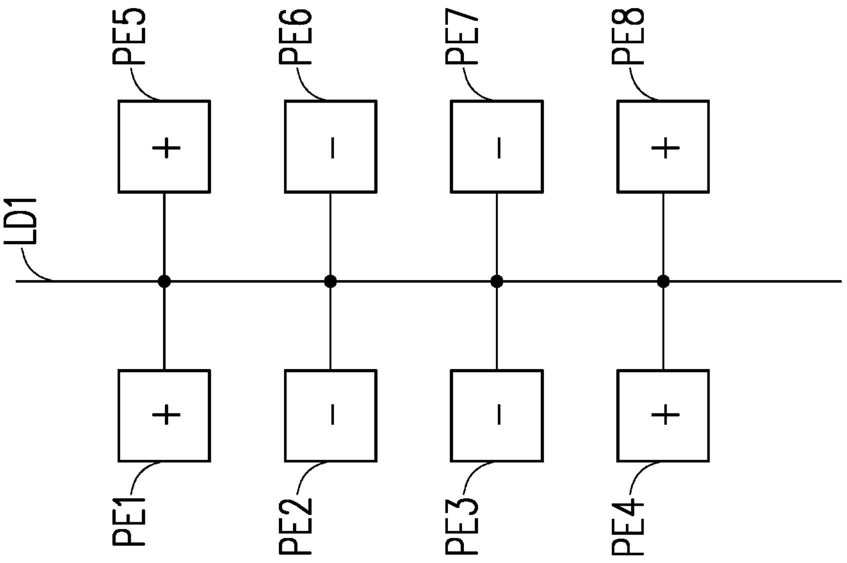
FIG. 3A is a configuration diagram of a data line and a pixel electrode according to an embodiment of the disclosure.

Please refer to FIG. 3A. FIG. 3A is a configuration diagram of a data line and a pixel electrode according to an embodiment of the disclosure. FIG. 3A shows the data line LD1, the first pixel electrode PE1, the second pixel electrode PE2, a third pixel electrode PE3, a fourth pixel electrode PE4, a fifth pixel electrode PE5, a sixth pixel electrode PE6, a seventh pixel electrode PE7, and an eighth pixel electrode PE8. In the embodiment, the first pixel electrode PE1, the second pixel electrode PE2, the third pixel electrode PE3, the fourth pixel electrode PE4, the fifth pixel electrode PE5, the sixth pixel electrode PE6, the seventh pixel electrode PE7, and the eighth pixel electrode PE8 are all coupled to the data line LD1. In the embodiment, the first pixel electrode PE1, the second pixel electrode PE2, the third pixel electrode PE3, and the fourth pixel electrode PE4 are located on a first side of the data line LD1 (for example, the left side of the data line LD1). The fifth pixel electrode PE5, the sixth pixel electrode PE6, the seventh pixel electrode PE7, and the eighth pixel electrode PE8 are located on a second side of the data line LD1 (for example, the right side of the data line LD1). The second side is opposite to the first side. In the embodiment, the configuration of FIG. 3A is applicable to a dual-gate line driving structure, but the disclosure is not limited thereto.

In the embodiment, the first pixel electrode PE1, the second pixel electrode PE2, the third pixel electrode PE3, the fourth pixel electrode PE4, the fifth pixel electrode PE5, the sixth pixel electrode PE6, the seventh pixel electrode PE7, and the eighth pixel electrode PE8 sequentially receive voltage values through the data line LD1 respectively during different periods. Further, taking the embodiment as an example, based on a scanning order, the first pixel electrode PE1 receives the voltage value (for example, the corresponding display data DD1 shown in FIG. 1) during the first period. Next, the second pixel electrode PE2 receives the voltage value (for example, the corresponding display data DD2 shown in FIG. 1) during the second period following the first period. Next, the third pixel electrode PE3 receives the voltage value during a third period following the second period, and so on. After the eighth pixel electrode PE8 receives the voltage value during an eighth period following a seventh period, it will return to the first pixel electrode PE1 to receive the voltage value during a ninth period (that is, the first period of the next frame) following the eighth period.

In the embodiment, the polarities of the first pixel electrode PE1, the fourth pixel electrode PE4, the fifth pixel electrode PE5, and the eighth pixel electrode PE8 are respectively positive polarities, marked as "+" (also referred to as first polarities). The polarities of the second pixel electrode PE2, the third pixel electrode PE3, the sixth pixel electrode PE6, and the seventh pixel electrode PE7 are respectively negative polarities, marked as "−" (also referred to as second polarities). The polarity design is referred to as "1+2 line" polarity design. The polarity design visually reduces the generation of image lines by the display apparatus.

In the embodiment, the display data corresponding to the second pixel electrode PE2 and the previous pixel electrode (that is, the first pixel electrode PE1) respectively have different polarities, that is, polarity switching is performed. Similarly, polarity switching is performed on the fourth pixel electrode PE4 compared with the third pixel electrode PE3, the sixth pixel electrode PE6 compared with the fifth pixel electrode PE5, and the eighth pixel electrode PE8 compared with the seventh pixel electrode PE7. Therefore, based on the over drive compensation, the voltage values of the display data received by the second pixel electrode PE2, the fourth pixel electrode PE4, the sixth pixel electrode PE6, and the eighth pixel electrode PE8 have greater voltage value changes compared with the voltage values of the display data received by the previous pixel electrodes.

Figure 3B:
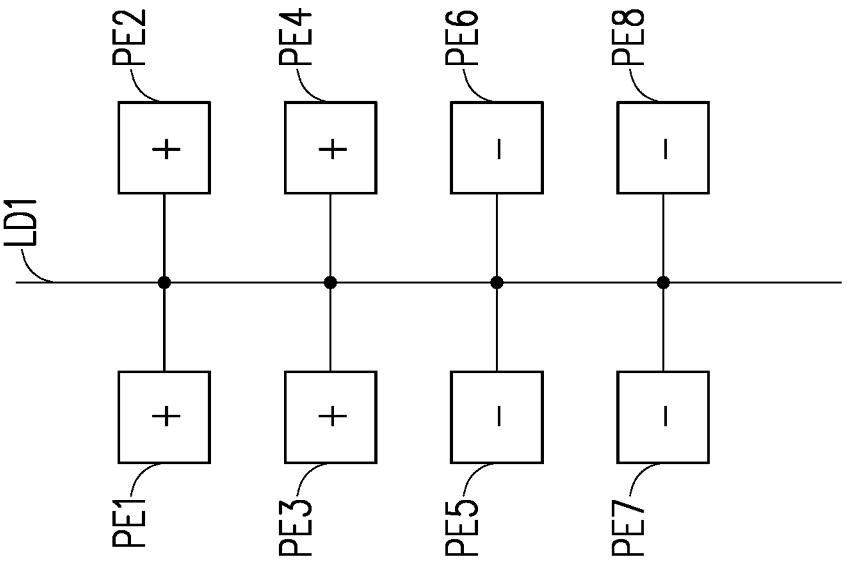
FIG. 3B is a configuration diagram of a data line and a pixel electrode according to another embodiment of the disclosure.

Please refer to FIG. 3B. FIG. 3B is a configuration diagram of a data line and a pixel electrode according to another embodiment of the disclosure. FIG. 3B shows the data line LD1, the first pixel electrode PE1, the second pixel electrode PE2, the third pixel electrode PE3, the fourth pixel electrode PE4, the fifth pixel electrode PE5, the sixth pixel electrode PE6, the seventh pixel electrode PE7, and the eighth pixel electrode PE8. In the embodiment, the first pixel electrode PE1, the second pixel electrode PE2, the third pixel electrode PE3, the fourth pixel electrode PE4, the fifth pixel electrode PE5, the sixth pixel electrode PE6, the seventh pixel electrode PE7, and the eighth pixel electrode PE8 are all coupled to the data line LD1. The first pixel electrode PE1, the third pixel electrode PE3, the fifth pixel electrode PE5, and the seventh pixel electrode PE7 are located on the first side of the data line LD1 (for example, the left side of the data line LD1). The second pixel electrode PE2, the fourth pixel electrode PE4, the sixth pixel electrode PE6, and the eighth pixel electrode PE8 are located on the second side of the data line LD1 (for example, the right side of the data line LD1). The second side is opposite to the first side. In the embodiment, the configuration of FIG. 3B is applicable to the dual-gate line driving structure, but the disclosure is not limited thereto.

In the embodiment, the first pixel electrode PE1, the second pixel electrode PE2, the third pixel electrode PE3, the fourth pixel electrode PE4, the fifth pixel electrode PE5, the sixth pixel electrode PE6, the seventh pixel electrode PE7, and the eighth pixel electrode PE8 sequentially receive voltage values through the data line LD1 respectively during different periods. Further, taking the embodiment as an example, based on the scanning order, the first pixel electrode PE1 receives the voltage value (for example, the corresponding display data DD1 shown in FIG. 1) during the first period. Next, the second pixel electrode PE2 receives the voltage value during the second period following the first period. Next, the third pixel electrode PE3 receives the voltage value during the third period following the second period, and so on.

In the embodiment, the polarities of the first pixel electrode PE1, the second pixel electrode PE2, the third pixel electrode PE3, and the fourth pixel electrode PE4 are respectively positive polarities, marked as "+". The polarities of the fifth pixel electrode PE5, the sixth pixel electrode PE6, the seventh pixel electrode PE7, and the eighth pixel electrode PE8 are respectively negative polarities, marked as "−". The polarity design is referred to as "4 line" polarity design. The polarity design visually reduces the generation of image lines by the display apparatus.

In the embodiment, polarity switching is respectively performed on the display data corresponding to the first pixel electrode PE1 and the fifth pixel electrode PE5. Therefore, based on the over drive compensation, the voltage values of the display data received by the first pixel electrode PE1 and the fifth pixel electrode PE5 have greater voltage value changes compared with the voltage values of the display data received by the previous pixel electrodes.

Figure 4:
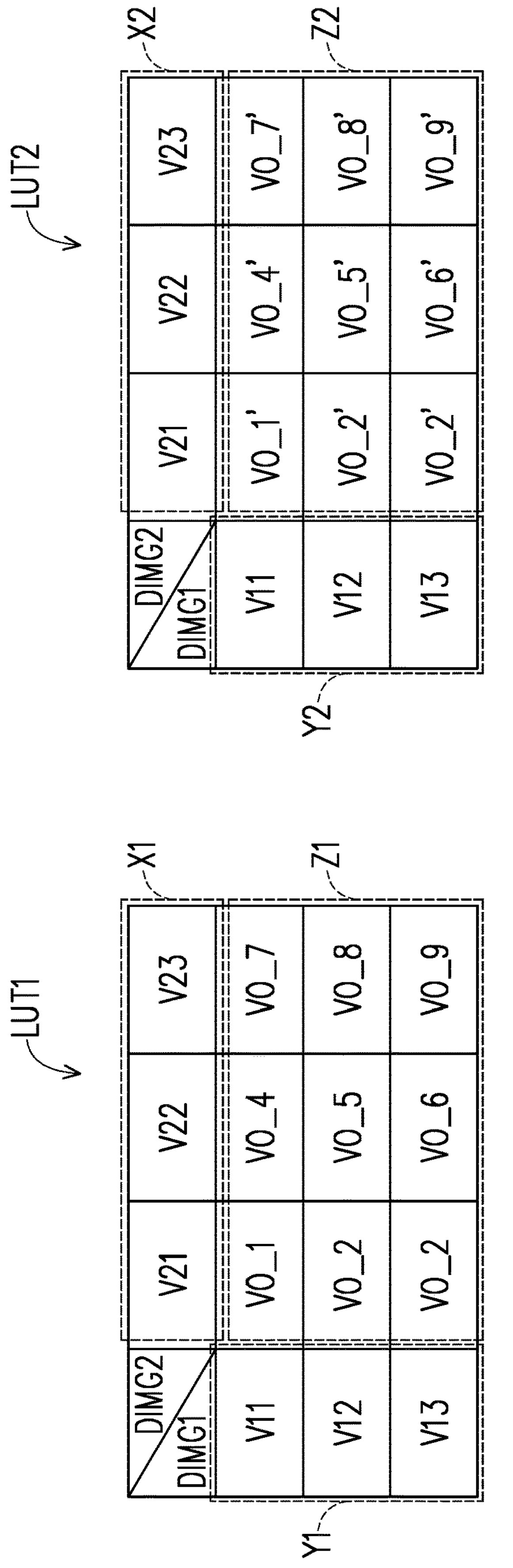
FIG. 4 is a schematic diagram of a first lookup table and a second lookup table according to an embodiment of the disclosure.

Please refer to FIG. 1 and FIG. 4 at the same time. FIG. 4 is a schematic diagram of a part of a first lookup table LUT1 and a part of a second lookup table LUT2 according to an embodiment of the disclosure. FIG. 4 shows a simplified schematic diagram of the first lookup table LUT1 and the second lookup table LUT2.

In the embodiment, a field Y1 column in the first lookup table LUT1 shows values V11, V12, and V13 of the first original image data DIMG1. A field X1 column in the first lookup table LUT1 shows values V21, V22, and V23 of the second original image data DIMG2. A field Z1 column in the first lookup table LUT1 shows values VO_1 to VO_9 of the display data DD2. A field Y2 column in the second lookup table LUT2 shows values the V11, V12, and V13 of the first original image data DIMG1. A field X2 column in the second lookup table LUT2 shows the values V21, V22, and V23 of the second original image data DIMG2. A field Z2 column in the second lookup table LUT2 shows values VO_1' to VO_9' of the display data DD2.

In the embodiment, the values V11, V12, V13, V21, V22, V23, VO_1 to VO_9, and VO_1' to VO_9' may be voltage values or grayscale values, but the disclosure is not limited thereto. In the embodiment, the number of the values V11, V12, and V13, the values V21, V22, and V23, and the values VO_1 to VO_9 and VO_1' to VO_9' is only 3 as an example, but the disclosure is not limited thereto.

In the embodiment, the processing circuit 120 judges to generate the display data DD2 according to the relationship between the first polarity data POL1 and the second polarity data POL2 and the relationship between the first original image data DIMG1 and the second original image data DIMG2. When the first polarity data POL1 is equal to the second polarity data POL2, it means that the polarity of the second original image data DIMG2 is not switched. Therefore, the processing circuit 120 may generate the display data DD2 according to the first lookup table LUT1.

For example, in the case where the polarity of the second original image data DIMG2 is not switched, when the value of the first original image data DIMG1 is equal to the value V11 and the value of the second original image data DIMG2 is equal to the value V21, the processing circuit 120 generates the display data DD2 with the value VO_1 according to the first lookup table LUT1. Therefore, the processing circuit 120 performs the first adjustment on the second original image data DIMG2 to generate the display data DD2 with the value VO_1.

As another example, in the case where the polarity of the second original image data DIMG2 is not switched, when the value of the first original image data DIMG1 is equal to the value V12 and the value of the second original image data DIMG2 is equal to the value V21, the processing circuit 120 generates the display data DD2 with the value VO_2 according to the first lookup table LUT1. Therefore, the processing circuit 120 performs the first adjustment on the second original image data DIMG2 to generate the display data DD2 with the value VO_2.

In addition, in the case where the polarity of the second original image data DIMG2 is not switched, the processing circuit 120 may judge determine whether the difference DV between the second original image data DIMG2 and the first original image data DIMG1 is less than or equal to a default value. When the difference DV is less than or equal to the default value, it means that the second original image data DIMG2 is close to or equal to the first original image data DIMG1 in the case where the polarity of the second original image data DIMG2 is not switched. Therefore, the processing circuit 120 converts the second original image data DIMG2 into the display data DD2 without adjusting or compensating the second original image data DIMG2. For example, when the value V11 is close to the value V21, the value VO_1 is equal to the value V21. In an embodiment, when the difference DV between the second original image data DIMG2 and the first original image data DIMG1 is less than or equal to 5 gray scales, the second original image data DIMG2 does not need to be adjusted or compensated. In another embodiment, when the difference DV is less than or equal to 3 gray scales, the second original image data DIMG2 does not need to be adjusted or compensated to reduce the time or the power consumption of the processing circuit 120 to generate the display data DD2.

On the other hand, when the difference DV is greater than the default value, it means that the difference between the second original image data DIMG2 and the first original image data DIMG1 is large in the case where the polarity of the second original image data DIMG2 is not switched. Therefore, the processing circuit 120 adjusts or compensates the second original image data DIMG2 to generate the display data DD2. For example, when the difference between the value V12 and the value V21 is large, the value VO_2 may not be equal to the value V21.

In the embodiment, when the first polarity data POL1 is not equal to the second polarity data POL2, it means that the polarity of the second original image data DIMG2 is different from the polarity of the first original image data DIMG1, in other words, the polarity of the second original image data DIMG2 is switched. Therefore, the processing circuit 120 may generate the display data DD2 according to the second lookup table LUT2.

For example, in the case where the polarity of the second original image data DIMG2 is switched, when the value of the first original image data DIMG1 is equal to the value V11 and the value of the second original image data DIMG2 is equal to the value V21, the processing circuit 120 generates the display data DD2 with the value VO_1' according to the first lookup table LUT1. Therefore, the processing circuit 120 performs a second compensation on the second original image data DIMG2 to generate the display data DD2 with the value VO_1'.

As another example, in the case where the polarity of the second original image data DIMG2 is switched, when the value of the first original image data DIMG1 is equal to the value V12 and the value of the second original image data DIMG2 is equal to the value V21, the processing circuit 120 generates the display data DD2 with the value VO_2' according to the first lookup table LUT1. Therefore, the processing circuit 120 performs the second compensation on the second original image data DIMG2 to generate the display data DD2 with the value VO_2'.

Figure 5:
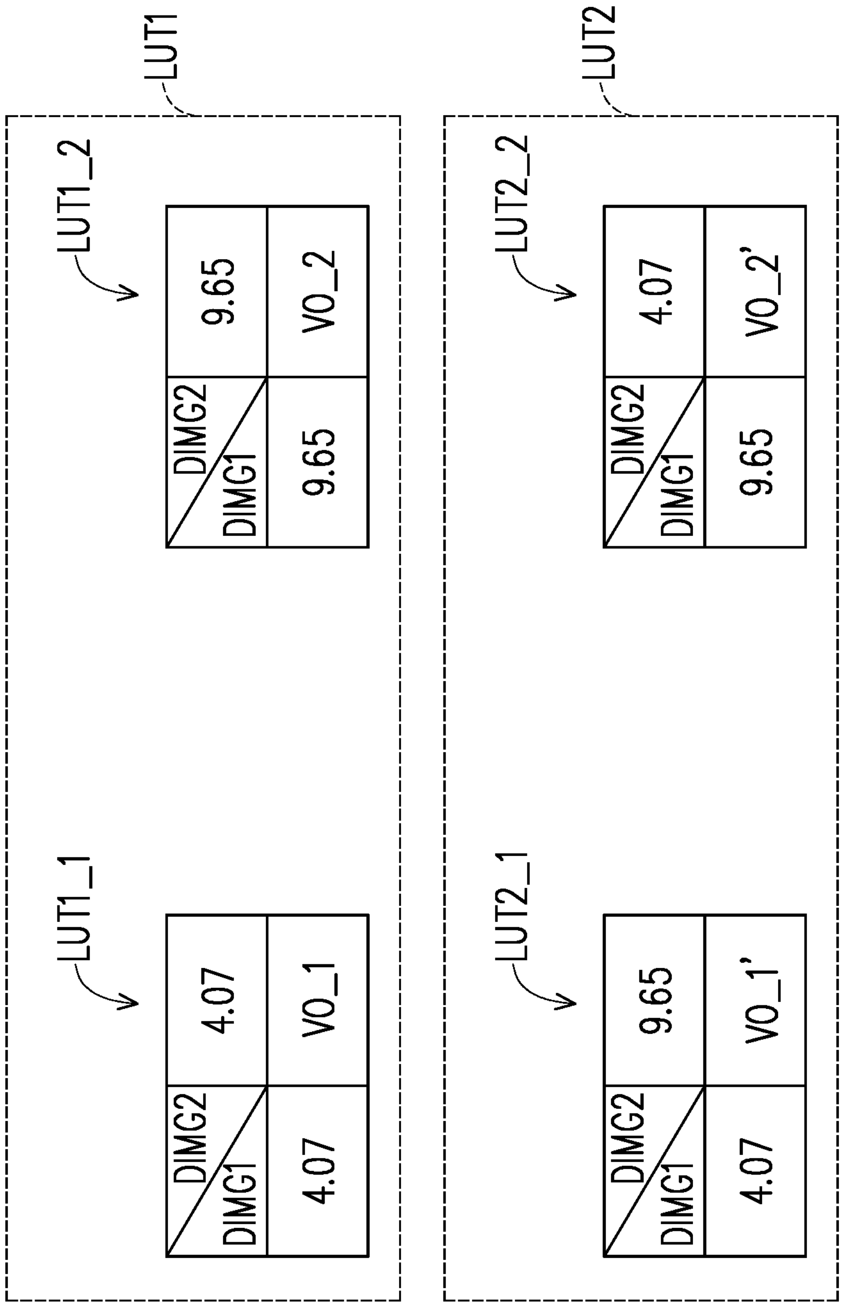
FIG. 5 is a usage schematic diagram according to the first lookup table and the second lookup table shown in FIG. 3A.

Please refer to FIG. 3A, FIG. 4, and FIG. 5 at the same time. FIG. 5 is a usage schematic diagram according to the first lookup table and the second lookup table shown in FIG. 3A. FIG. 5 shows a first part LUT1_1 and a second part LUT1_2 of the first lookup table LUT1 and a first part LUT2_1 and a second part LUT2_2 of the second lookup table LUT2. The embodiment is, for example, applicable to a display application in which the display apparatus 100 runs in 64 gray scales, but the disclosure is not limited thereto.

For example, the first original image data DIMG1 corresponds to the eighth pixel electrode PE8, and the value of the first original image data DIMG1 may be, for example, a voltage value of 9.65 volts (V). The second original image data DIMG2 corresponds to the first pixel electrode PE1, and the value of the second original image data DIMG2 may be, for example, a voltage value of 9.65 volts. Since the eighth pixel electrode PE8 and the first pixel electrode PE1 have the same polarity, based on the second part LUT1_2 of the first lookup table LUT1, the display data DD2 with the value VO_2 is generated and provided to the first pixel electrode PE1 through the data line LD1. Similarly, the display data provided to the fifth pixel electrode PE5 is also generated based on the first lookup table LUT1.

For example, the first original image data DIMG1 corresponds to the first pixel electrode PE1, and the value of the first original image data DIMG1 may be, for example, a voltage value of 9.65 volts. The second original image data DIMG2 corresponds to the second pixel electrode PE2, and the value of the second original image data DIMG2 may be, for example, a voltage value of 4.07 volts. Since the first pixel electrode PE1 and the second pixel electrode PE2 have different polarities, based on the second part LUT2_2 of the second lookup table LUT2, the display data DD2 with the value VO_2' is generated and provided to the second pixel electrode PE2 through the data line LD1. Similarly, the display data provided to the sixth pixel electrode PE6 is also generated based on the second lookup table LUT2.

For example, the first original image data DIMG1 corresponds to the second pixel electrode PE2, and the value of the first original image data DIMG1 may be, for example, a voltage value of 4.07 volts. The second original image data DIMG2 corresponds to the third pixel electrode PE3, and the value of the second original image data DIMG2 may be, for example, a voltage value of 4.07 volts. Since the third pixel electrode PE3 and the second pixel electrode PE2 have the same polarity, based on the first part LUT1_1 of the first lookup table LUT1, the display data DD2 with the value VO_1 is generated and provided to the third pixel electrode PE3 through the data line LD1. Similarly, the display data provided to the seventh pixel electrode PE7 is also generated based on the first lookup table LUT1.

For example, the first original image data DIMG1 corresponds to the third pixel electrode PE3, and the value of the first original image data DIMG1 may be, for example, a voltage value of 4.07 volts. The second original image data DIMG2 corresponds to the fourth pixel electrode PE4, and the value of the second original image data DIMG2 may be, for example, a voltage value of 9.65 volts. Since the fourth pixel electrode PE4 and the third pixel electrode PE3 have different polarities, based on the first part LUT2_1 of the second lookup table LUT2, the display data DD2 with the value VO_1' is generated and provided to the fourth pixel electrode PE4 through the data line LD1. Similarly, the display data provided to the eighth pixel electrode PE8 is also generated based on the second lookup table LUT2.

In addition, the values in the second lookup table LUT2 are further adjusted for the over drive compensation for polarity switching. Therefore, the value VO_1' is greater than the value VO_2. The value VO_2 is greater than the value VO_1. The value VO_1 is greater than the value VO_2'.

Figure 6:
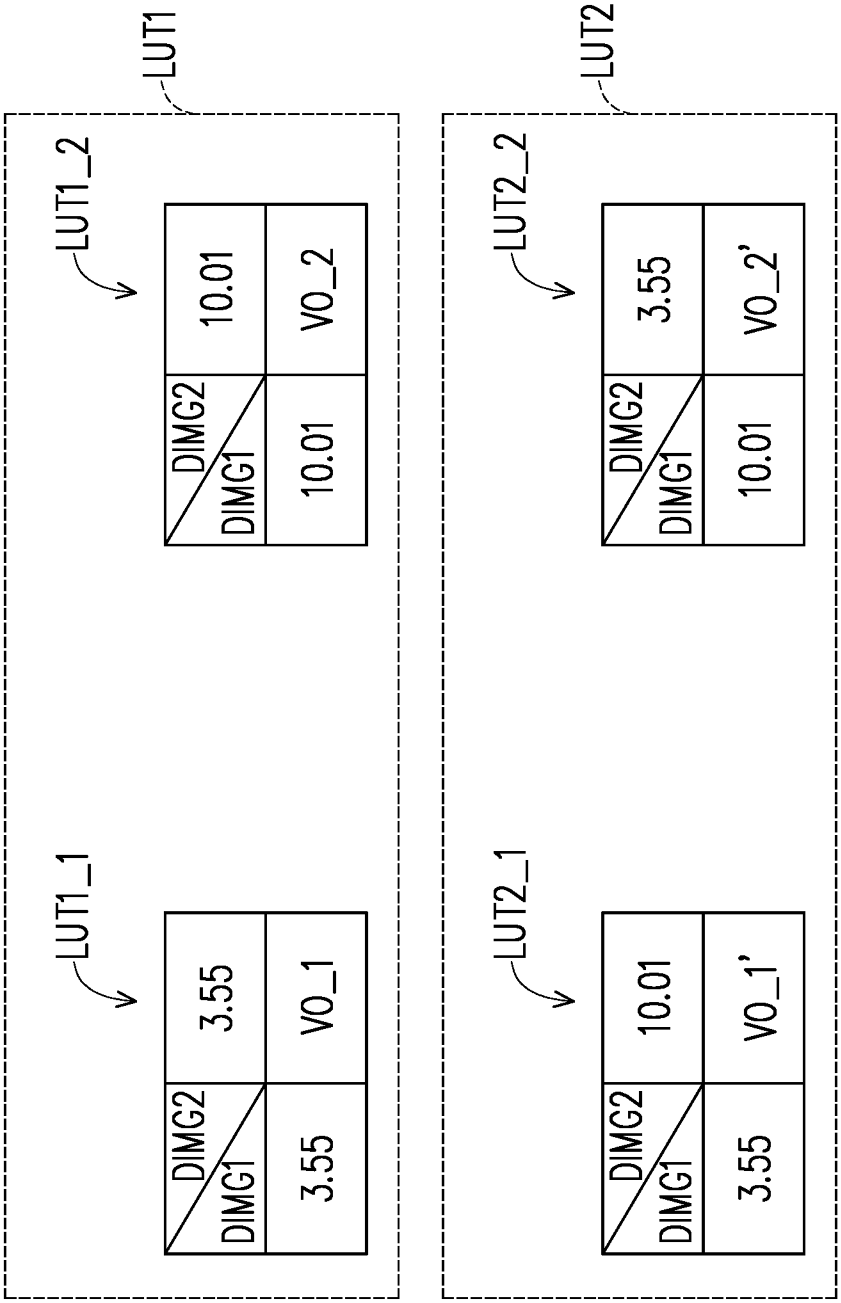
FIG. 6 is a usage schematic diagram according to the first lookup table and the second lookup table shown in FIG. 3B.

Please refer to FIG. 3B, FIG. 4, and FIG. 6 at the same time. FIG. 6 is a usage schematic diagram according to the first lookup table and the second lookup table shown in FIG. 3B. FIG. 6 shows the first part LUT1_1 and the second part LUT1_2 of the first lookup table LUT1 and the first part LUT2_1 and the second part LUT2_2 of the second lookup table LUT2. The embodiment is, for example, applicable to a display application in which the display apparatus 100 runs in 128 gray scales.

For example, the first original image data DIMG1 corresponds to the eighth pixel electrode PE8, and the value of the first original image data DIMG1 may be, for example, a voltage value of 3.55 volts. The second original image data DIMG2 corresponds to the first pixel electrode PE1, and the value of the second original image data DIMG2 may be, for example, a voltage value of 10.01 volts. Since the eighth pixel electrode PE8 and the first pixel electrode PE1 have different polarities, based on the first part LUT2_1 of the second lookup table LUT2, the display data DD2 with the value VO_1' is generated and provided to the first pixel electrode PE1 through the data line LD1.

For example, the first original image data DIMG1 corresponds to the first pixel electrode PE1, and the value of the first original image data DIMG1 may be, for example, a voltage value of 10.01 volts. The second original image data DIMG2 corresponds to the second pixel electrode PE2, and the value of the second original image data DIMG2 may be, for example, a voltage value of 10.01 volts. Since the first pixel electrode PE1 and the second pixel electrode PE2 have the same polarity, based on the second part LUT1_2 of the first lookup table LUT1, the display data DD2 with the value VO_2 is generated and provided to the second pixel electrode PE2 through the data line LD1. Similarly, the display data provided to the third pixel electrode PE3 and the fourth pixel electrode PE4 are also generated based on the first lookup table LUT1.

For example, the first original image data DIMG1 corresponds to the fourth pixel electrode PE4, and the value of the first original image data DIMG1 may be, for example, a voltage value of 10.01 volts. The second original image data DIMG2 corresponds to the fifth pixel electrode PE5, and the value of the second original image data DIMG2 may be, for example, a voltage value of 3.55 volts. Since the fourth pixel electrode PE4 and the fifth pixel electrode PE5 have different polarities, based on the second part LUT2_2 of the second lookup table LUT2, the display data DD2 with the value VO_2' is generated and provided to the fifth pixel electrode PE5 through the data line LD1.

For example, the first original image data DIMG1 corresponds to the fifth pixel electrode PE5, and the value of the first original image data DIMG1 may be, for example, a voltage value of 3.55 volts. The second original image data DIMG2 corresponds to the sixth pixel electrode PE6, and the value of the second original image data DIMG2 may be, for example, a voltage value of 3.55 volts. Since the fifth pixel electrode PE5 and the sixth pixel electrode PE6 have the same polarity, based on the first part LUT1_1 of the first lookup table LUT1, the display data DD2 with the value VO_1 is generated and provided to the sixth pixel electrode PE6 through the data line LD1. Similarly, the display data provided to the seventh pixel electrode PE7 and the eighth pixel electrode PE8 are also generated based on the first lookup table LUT1.

In addition, the values in the second lookup table LUT2 are further adjusted for the over drive compensation for polarity switching. Therefore, the value VO_1' is greater than the value VO_2. The value VO_2 is greater than the value VO_1. The value VO_1 is greater than the value VO_2'.

Figure 7:
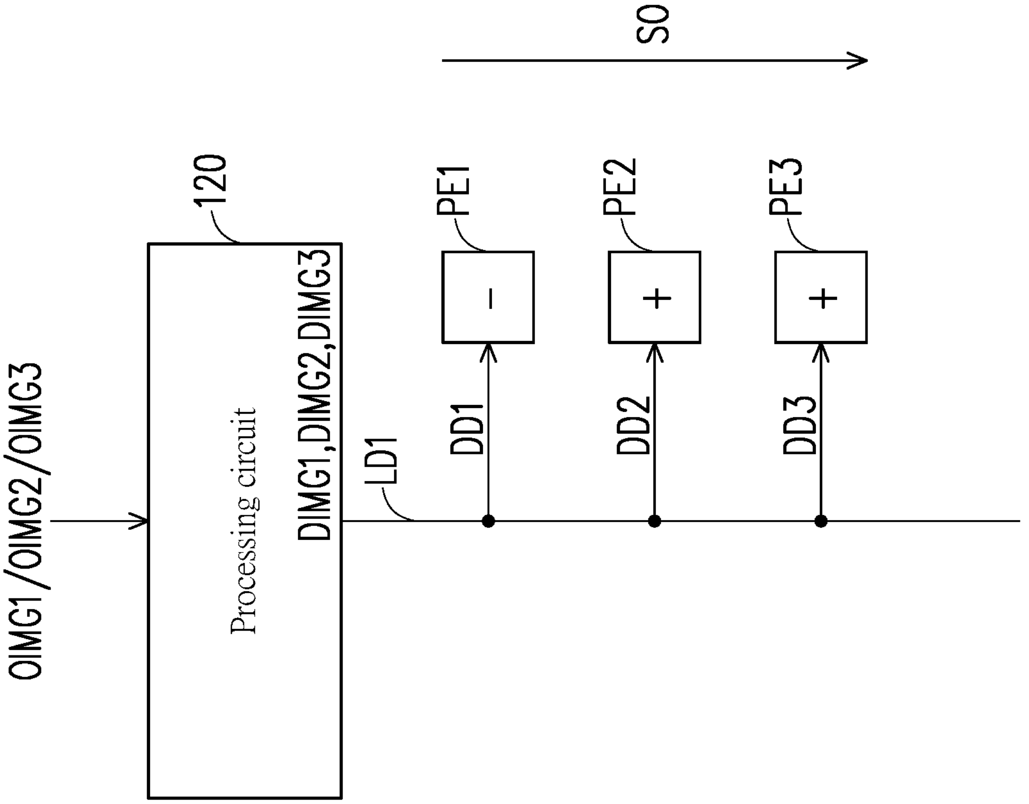
FIG. 7 is a test schematic diagram according to an embodiment of the disclosure.

Please refer to FIG. 7. FIG. 7 is a test schematic diagram according to an embodiment of the disclosure. FIG. 7 shows the data line LD1, the first pixel electrode PE1, the second pixel electrode PE2, and the third pixel electrode PE3. In the embodiment, the first pixel electrode PE1, the second pixel electrode PE2, and the third pixel electrode PE3 are coupled to the data line LD1.

During a first test period, the processing circuit 120 receives a test original image OIMG1. In the embodiment, multiple data corresponding to the first pixel electrode PE1, the second pixel electrode PE2, and the third pixel electrode PE3 in the test original image OIMG1 are the same. Therefore, the gray scales visually presented by multiple pixel units corresponding to the first pixel electrode PE1, the second pixel electrode PE2, and the third pixel electrode PE3 are the same.

The processing circuit 120 converts the data corresponding to the first pixel electrode PE1 in the test original image OIMG1 into the first original image data DIMG1, converts the data corresponding to the second pixel electrode PE2 in the test original image OIMG1 into the second original image data DIMG2, and converts the data corresponding to the third pixel electrode PE3 in the test original image OIMG1 into a third original image data DIMG3. In addition, the processing circuit 120 generates the display data DD1 according to the first original image data DIMG1, generates the display data DD2 according to the second original image data DIMG2, and generates the display data DD3 according to the third original image data DIMG3. The first pixel electrode PE1, the second pixel electrode PE2, and the third pixel electrode PE3 sequentially receive the display data DD1, the display data DD2, and the display data DD3 through the data line LD1 respectively based on a scanning order SO.

For example, based on the polarity switching rule, through the measurement of the first pixel electrode PE1, the second pixel electrode PE2, and the third pixel electrode PE3, the embodiment can know that the polarity of the first pixel electrode PE1 and the polarity of the second pixel electrode PE2 are different during the first test period. In addition, the polarity of the second pixel electrode PE2 and the polarity of the third pixel electrode PE3 are the same. For example, during the first test period, the polarity of the first pixel electrode PE1 is judged to be "–". The polarities of the second pixel electrode PE2 and the third pixel electrode PE3 are respectively judged to be "+".

Figure 8B:
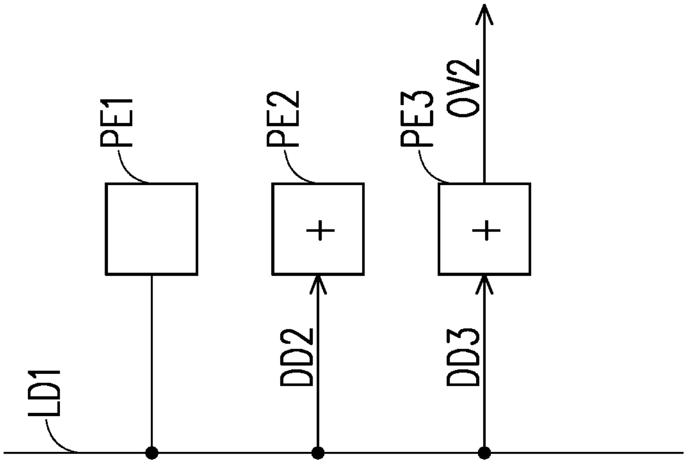
FIG. 8B is a test schematic diagram during a third test period according to FIG. 7.
Figure 8A:
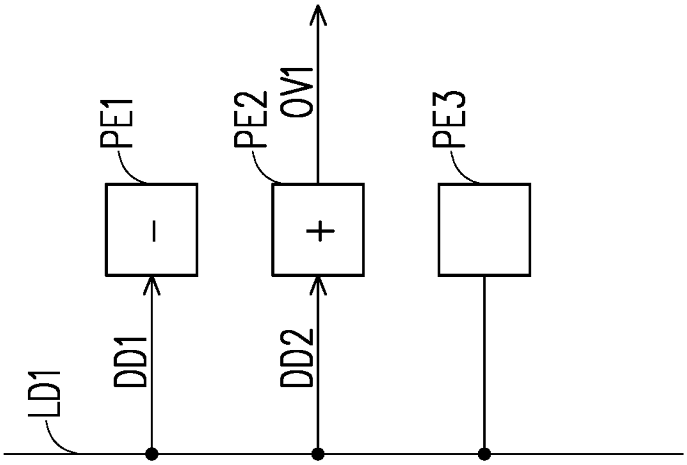
FIG. 8A is a test schematic diagram during a second test period according to FIG. 7.

Next, please refer to FIG. 7 and FIG. 8A at the same time. FIG. 8A is a test schematic diagram during a second test period according to FIG. 7. During the second test period, the processing circuit 120 receives a test original image OIMG2. In the embodiment, multiple display data corresponding to the first pixel electrode PE1 and the second pixel electrode PE2 in the test original image OIMG2 are the same. Therefore, during the second test period, the gray scales visually presented by multiple pixel units corresponding to the first pixel electrode PE1 and the second pixel electrode PE2 are the same.

During the second test period, a voltage value OV1 at the second pixel electrode PE2 may be measured.

Next, please refer to FIG. 7 and FIG. 8B at the same time. FIG. 8B is a test schematic diagram during a third test period according to FIG. 7. During the third test period, the processing circuit 120 receives a test original image OIMG3. In the embodiment, multiple display data corresponding to the second pixel electrode PE2 and the third pixel electrode PE3 in the test original image OIMG3 are the same as the display data corresponding to the second pixel electrode PE2 in the test original image OIMG2. Therefore, during the third test period, the gray scales visually presented by multiple pixel units corresponding to the second pixel electrode PE2 and the third pixel electrode PE3 are the same. In addition, the gray scales visually presented by the pixel unit corresponding to the second pixel electrode PE2 during the second test period and the third test period are also the same.

During the third test period, a voltage value OV2 at the third pixel electrode PE3 may be measured.

Next, the voltage value OV2 and the voltage value OV1 are compared. It should be noted that compared with the polarity of the first pixel electrode PE1, the polarity of the second pixel electrode PE2 is switched. Therefore, the display data DD2 and the voltage value OV1 are adjusted for the over drive compensation for polarity switching. Compared with the polarity of the second pixel electrode PE2, the polarity of the third pixel electrode PE3 is not switched. Therefore, the display data DD3 and the voltage value OV2 are not compensated by the over drive for polarity switching. Based on the above, even if the polarity of the second pixel electrode PE2 and the polarity of the third pixel electrode PE3 are the same, the voltage value OV2 is different from the voltage value OV1. Furthermore, based on the over drive compensation for polarity switching, the voltage value OV1 of the second pixel electrode PE2 whose polarity is judged to be "+" is greater than the voltage value OV2.

In summary, the processing circuit generates the display data according to the difference, the relationship between the first polarity data and the second polarity data, and the relationship between the first original image data and the second original image data. The processing circuit correspondingly adjusts or compensates the display data according to the difference and the mode of polarity switching. In this way, regardless of whether polarity switching is performed on the second original image data, the risk of distortion of the visual effect presented by the display apparatus based on the display data can be reduced.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A display apparatus, comprising:

a data line;

a first pixel electrode, coupled to the data line and receiving first display data during a first period;

a second pixel electrode, coupled to the data line and receiving second display data during a second period following the first period; and a processing circuit, configured to generate first polarity data and second polarity data, and generate first original image data corresponding to the first polarity data and second original image data corresponding to the second polarity data according to an original image, generate the second display data according to a difference between the second original image data and the first original image data and a relationship between the second polarity data and the first polarity data, and provide the second display data to the second pixel electrode through the data line.

2. The display apparatus according to claim 1, wherein the first pixel electrode and the second pixel electrode are respectively located on a same side of the data line.

3. The display apparatus according to claim 1, wherein the first pixel electrode and the second pixel electrode are respectively located on two sides of the data line.

4. The display apparatus according to claim 1, wherein the first polarity data is equal to the second polarity data.

5. The display apparatus according to claim 4, wherein when the first polarity data is equal to the second polarity data, the processing circuit judges that a polarity of the second original image data is not switched compared with a polarity of the first original image data.

6. The display apparatus according to claim 4, wherein the processing circuit generates the second display data according to a first lookup table.

7. The display apparatus according to claim 6, wherein when the difference between the second original image data and the first original image data is greater than a default value, the processing circuit generates the second display data according to the first lookup table.

8. The display apparatus according to claim 4, wherein when the difference between the second original image data and the first original image data is less than or equal to a default value, the processing circuit converts the second original image data into the second display data.

9. The display apparatus according to claim 1, wherein the first polarity data is not equal to the second polarity data.

10. The display apparatus according to claim 9, wherein when the first polarity data is equal to the second polarity data, the processing circuit judges that a polarity of the second original image data is switched compared with a polarity of the first original image data.

11. The display apparatus according to claim 9, wherein the processing circuit performs an over drive compensation for polarity switching on the second display data.

12. The display apparatus according to claim 9, wherein the processing circuit generates the second display data according to a second lookup table.

13. The display apparatus according to claim 9, wherein:

there is a first value change between a value of the second original image data and a value of the first original image data, there is a second value change between a value of the second display data and a value of the first original image data, and the second value change is greater than the first value change.

14. A control method, applicable to a display apparatus, wherein the display apparatus comprises a data line, a first pixel electrode, and a second pixel electrode, wherein the first pixel electrode is coupled to the data line and receives first display data during a first period, and the second pixel electrode is coupled to the data line and receives second display data during a second period following the first period, the control method comprising:

generating first original image data and second original image data according to an original image, wherein the first original image data corresponds to first polarity data, and the second original image data corresponds to second polarity data;

generating the second display data according to a difference between the second original image data and the first original image data and a relationship between the second polarity data and the first polarity data; and providing the second display data to the second pixel electrode through the data line.

15. The control method according to claim 14, wherein the step of generating the second display data according to the difference between the second original image data and the first original image data and the relationship between the second polarity data and the first polarity data comprises:

generating the second display data according to a first lookup table when the first polarity data is equal to the second polarity data.

16. The control method according to claim 14, wherein the step of generating the second display data according to the difference between the second original image data and the first original image data and the relationship between the second polarity data and the first polarity data comprises:

converting the second original image data into the second display data when the first polarity data is equal to the second polarity data and the difference between the second original image data and the first original image data is less than or equal to a default value.

17. The control method according to claim 14, wherein the step of generating the second display data according to the difference between the second original image data and the first original image data and the relationship between the second polarity data and the first polarity data comprises:

performing an over drive compensation for polarity switching on the second display data when the first polarity data is different from the second polarity data.

18. The control method according to claim 14, wherein the step of generating the second display data according to the difference between the second original image data and the first original image data and the relationship between the second polarity data and the first polarity data comprises:

generating the second display data according to a second lookup table when the first polarity data is different from the second polarity data.

19. The control method according to claim 18, wherein the step of generating the second display data according to the second lookup table comprises:

performing an over drive compensation for polarity switching on the second display data according to the second lookup table.

20. The control method according to claim 14, wherein:

there is a first value change between a value of the second original image data and a value of the first original image data, there is a second value change between a value of the second display data and a value of the first original image data when the first polarity data is different from the second polarity data, and the second value change is greater than the first value change.

* * * * *